_US005446114A_

United States Patent [19]

O'Lenick, Jr.

[11] Patent Number: 5,446,114
[45] Date of Patent: Aug. 29, 1995

[54] FLUORINATED DIMETHICONE COPOLYOLS

[75] Inventor: Anthony J. O'Lenick, Jr., Lilburn, Ga.

[73] Assignee: Siltech Inc., Norcross, Ga.

[21] Appl. No.: 356,551

[22] Filed: Dec. 15, 1994

[51] Int. Cl.$^6$ ............................................. C08G 77/08
[52] U.S. Cl. .................................... 528/15; 528/25; 528/29; 528/31; 556/445; 556/446; 556/449; 556/450; 556/453; 556/488
[58] Field of Search .................... 528/31, 29, 25, 15; 556/449, 488, 445, 446, 449, 450, 453

[56] References Cited

U.S. PATENT DOCUMENTS 4,992,521  2/1991  Saho et al. ........................ 556/488
5,047,491  9/1991  Saho et al. ........................ 528/29

Primary Examiner—Melvyn I. Marquis

[57] ABSTRACT

The invention relates to a series of novel silicone fluorinated dimethicone copolyols. This class of compounds provides breathable barriers when applied to textiles and paper. These barriers allow for the passage of water and air through the barrier, but do not allow for the passage of oils. The compounds of the present invention are prepared by reacting a silanic hydrogen containing silicone polymer with a vinyl containing fluoro compound and an allyl alcohol alkoxylate.

11 Claims, No Drawings

FLUORINATED DIMETHICONE COPOLYOLS

BACKGROUND OF THE INVENTION

FIELD OF THE INVENTION

The invention relates to a series of novel silicone polymers containing both fluorine and alkylene oxide groups. This class of compounds provides breathable barriers when applied to textiles and paper. These barriers allow for the passage of water and air through the barrier, but do not allow for the passage of oils. The presence of (a) silicone backbone, (b) a fluorine containing pendant group and (c) a separate dimethicone copolyol group containing a free polar hydroxyl group is critical to the functionality of the molecule. If the fluorine containing group is lacking in the molecule, the desired impermeability to oil is not achieved. If the polar hydroxyl containing group is lacking in the molecule, the barrier is impermeable to both water and oil. If the fluorine is present in the same pendant group as the hydroxyl group the desired barrier is not achieved. Only when the correct combination of groups are placed in the molecule is the desired material achieved. By "oil" we mean water insoluble materials including triglycerides like soybean oil, refined oils like motor oil, and silicone oil.

The compounds of the present invention are prepared by reacting a silanic hydrogen containing silicone polymer with a vinyl containing fluoro compound and an allyl alcohol alkoxylate.

The compounds find application in a variety of applications, most importantly the textile and paper. The differentially permeable barrier is of interest for diapers and a variety of other non-woven paper applications.

ARTS AND PRACTICES

Silicone compounds have been known to be active at the surface of cellulosic and synthetic fibers as well as paper. They are good nondurable lubricants and are very stable to oxidation, however, their high cost and lack of efficiency at low concentrations as well as low durability have made their acceptance in commercial products quite low.

In addition to their high cost, silicone compounds have little or no solubility in mineral oils, fatty triglycerides and other classical fatty quaternary compounds used for softening. This has resulted in the inability to prepare stable blends for use as a textile fiber treatment.

In many applications, there is a desire for a more fatty soluble softener. The desired molecule should have the desirable softening and antistatic properties of silicone, yet have compatibility with traditional fatty materials and oils. Even though a textile softener which has both the desirable softening and antistatic properties of silicone as well as compatibility with fatty compounds has been a long felt need, it isn't until the compounds of the present invention that such a system has been attained.

Steman U.S. Pat. No. 3,511,699 issued May 12, 1970 teaches that epoxy compounds placed in the silicone backbone by hydrosilation can be cured onto certain fibers to give improved substantivity. The substantivity is based upon the reaction of hydroxyl groups on the cellulosic and the epoxy group in the silicone polymer.

O'Lenick U.S. Pat. No. 5,164,471 issued in October 1992 teaches that fluoro polyesters of silanols can be prepared by the reaction of a silanol, fluorine containing alcohol and a diacid.

None of these cited patents teach the incorporation of polar hydroxyl group and a separate fluorine containing group on the silicone backbone necessary to achieve the desired properties of the compounds of the present invention.

THE INVENTION

OBJECT OF THE INVENTION

It is the object of the present invention to provide novel fluorine containing dimethicone copolyols. Which offer unique barrier properties, allowing both air and water to pass the barrier and oil to be retained.

SUMMARY OF THE INVENTION

The present invention relates to a series of novel fluorine containing dimethicone copolyols. The compounds of the present invention are prepared by reacting a silanic hydrogen containing silicone polymer with a vinyl containing fluoro compound and an allyl alcohol alkoxylate.

As will become clear from the disclosure, the compounds of the present invention having silicone present in the molecule, fluorine present and a polar hydroxyl group present, all these result in the differentially permeable film desired.

The compounds of the present invention conform to the following structure;

Terminal Compounds

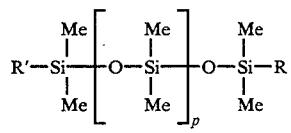

wherein;
p is an integer ranging from 1 to 2,000;
Me is methyl;
R' is $-(CH_2)_3-O-(EO)_a-(PO)_b-(EO)_c-H$ and
R is $-(CH_2)_2-(CF_2)_s-CF_3$;
s is an integer ranging from 1 to 13;
a, b and c are each independently integers ranging from 0 to 20;
EO is $-(CH_2CH_2-O)-$;
PO is a $-(CH_2CH(CH_3)-O)-$.

Comb Compounds

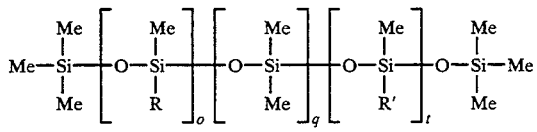

wherein;
Me is methyl;
o is an integer ranging from 1 to 20;
t is an integer ranging from 1 to 20;
q is an integer ranging from 0 to 2000;
R' is $-(CH_2)_3-O-(EO)_a-(PO)_b-(EO)_c-H$ and
R is $-(CH_2)_2-(CF_2)_s-CF_3$;
s is an integer ranging from 1 to 13;
a, b and c are each independently integers ranging from 0 to 20;
EO is $-(CH_2CH_{13}O)-$;
PO is a $-(CH_2CH(CH_3)-O)-$.

Silanic hydrogen containing compounds, used as raw materials in the preparation of the compounds of the present invention, are known to those skilled in the art. They conform to the following structures:

Terminal Silanic Hydrogen Polymers

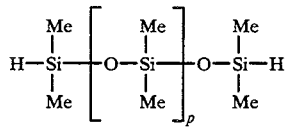

wherein;
Me is methyl;
p is an integer ranging from 1 to 2,000.

Comb Silanic Hydrogen Intermediates

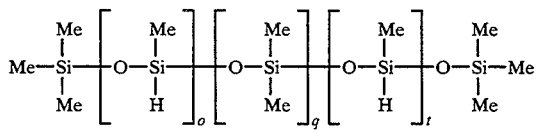

wherein;
Me is methyl;
o is an integer ranging from 1 to 20;
t is an integer ranging from 1 to 20;
q is an integer ranging from 0 to 2000.

These materials are one of the basic raw materials used in the preparation of the compounds of the present invention.

The silanic hydrogen compounds are reacted with (a) allyl alcohol alkoxylates conforming to the following structures and vinyl containing fluoro compounds.

$CH_2=CH-CH_2-O-(EO)_a-(PO)_b-(EO)_c-H$
EO is $-(CH_2CH_2-O)-$;
PO is a $-(CH_2CH(CH_3)-O)-$.

$(EO)_a-(PO)_b-(EO)_c-H$ and a, b and c are each independently integers ranging from 0 to 20; and (b) vinyl containing fluoro compounds conforming to the following structure:

$CH_2=CH-(CF_2)_s-CF_3$ s is an integer ranging from 1 to 13.

EXAMPLES

Raw Materials

A) Allyl Alcohol Alkoxylates

Allyl alcohol alkoxylates conform to the following structure and are commercially available from various sources including Siltech Inc. They conform to the following structure:

$CH_2=CH-CH_2-O-(EO)_a-(PO)_b-(EO)_c-H$

EO is $-(CH_2CH_2-O)-$;
PO is a $-(CH_2CH(CH_3)-O)-$.

$(EO)_a-(PO)_b-(EO)_c-H$ and a, b and c are each independently integers ranging from 0 to 20;

| Example | a | b | c |
|---------|---|---|---|
| 1 | 0 | 0 | 0 |
| 2 | 20 | 20 | 20 |
| 3 | 5 | 5 | 5 |
| 4 | 10 | 0 | 0 |
| 5 | 7 | 1 | 3 |
| 6 | 0 | 10 | 0 |
| 7 | 1 | 5 | 1 |
| 8 | 0 | 1 | 0 |
| 9 | 10 | 0 | 0 |

B) Fluoro Vinyl Intermediate

Fluoro Vinyl intermediates are commercially available from a variety of sources including DuPonte. They conform to the following structure:

$CH_2=CH-(CF_2)_s-CF_3$ s is an integer ranging from 1 to 13. These materials are available from Duponte.

Fluoro Vinyl Intermediates

| Example | s |
|---------|---|
| 10 | 1 |
| 11 | 5 |
| 12 | 7 |
| 13 | 11 |
| 14 | 13 |

C.) Silanic Hydrogen Containing Intermediates

The preferred method of placing this type of reactive hydroxyl group into the silicone polymer is by the reaction of silanic hydrogen containing polymer with allyl alcohol alkoxylates. This technology is well known to those skilled in the art and are described in U.S. Pat. No. 4,083,856.

Preparation of Silanic Hydrogen Containing Intermediates

Silicone intermediates of the type used to make the compounds of this invention are well known to those skilled in the art. U.S. Pat. No. 5,159,096 issued to Austin in November 1992, incorporated herein by reference discloses the basic chemistry of hydrosilation.

International Publication (Silicone Alkylene Oxide Copolymers As Foam Control Agents) WO 86/0541 by Paul Austin (Sep. 25, 1986) p.16 also teaches how to make these intermediates. The intermediates listed below are available from Siltech Inc. Norcross Ga. 30093 and are marketed under the Silseal tradename:

Silanic Hydrogen Containing Compounds (Comb Type)

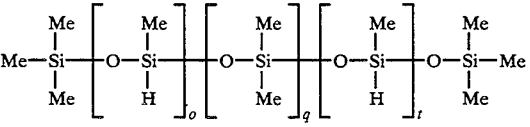

wherein;
Me is methyl;
o is an integer ranging from 1 to 20;
t is an integer ranging from 1 to 20;
q is an integer ranging from 0 to 2000.

| Example | o | t | q |
|---------|---|---|---|
| 15 | 1 | 1 | 1 |
| 16 | 10 | 20 | 50 |

-continued

| Example | o | t | q |
|---|---|---|---|
| 17 | 20 | 10 | 2000 |

Silanic Hydrogen Containing Compounds (Terminal Type)

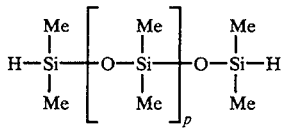

wherein;
Me is methyl;
p is an integer ranging from 1 to 2,000.

Silanic Hydrogen Containing Compounds

| Example | p |
|---|---|
| 18 | 2000 |
| 19 | 500 |
| 20 | 1 |

The intermediates listed below are available from Siltech Inc. Norcross Ga. 30093 and are marketed under the Silseal tradename.

Hydrosilation Reactions

The hydrosilation reaction is carried out according to the following reaction scheme:

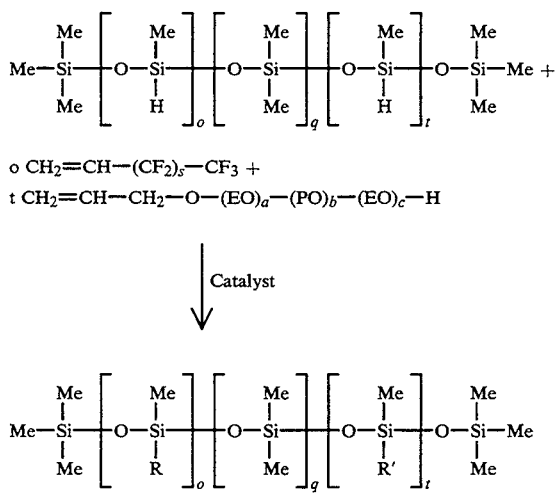

o $CH_2=CH-(CF_2)_s-CF_3$ +
t $CH_2=CH-CH_2-O-(EO)_a-(PO)_b-(EO)_c-H$

↓ Catalyst wherein;
Me is methyl;
o is an integer ranging from 1 to 20;
t is an integer ranging from 1 to 20;
q is an integer ranging from 0 to 2000;
R' is $-(CH_2)_3-O-(EO)_a-(PO)_b-(EO)_c-H$ and
R is $-(CH_2)_2-(CF_2)_s-CF_3$;
s is an integer ranging from 1 to 13;
a, b and c are each independently integers ranging from 0 to 20;
EO is $-(CH_2CH_2-O)-$;
PO is a $-(CH_2CH(CH_3)-O)-$.

Process

As stated previously, the hydrosilation process used to make the compounds of this invention are well known to those skilled in the art. One of many references is International Publication (Silicone Alkylene Oxide Copolymers As Foam Control Agents ) WO 86/0541 by Paul Austin (Sep. 25, 1986) p.19.

General Procedure

To a suitable flask fitted with a mechanical agitator, thermometer with a Therm-o-watch temperature regulator, nitrogen sparge tube vented reflux condenser and heating mantle is added the specified quantity of the specified Allyl Alcohol Alkoxylate Example 1-9, and the specified quantity of the specified Fluoro Vinyl Intermediate Example 10-14. Next is added the specified number of grams of the specified hydrosilation intermediate Example #15-20 and 3,000 grams of toluene. Heat to 115° C. to remove azeotropically remove any water and 200 ml of toluene. The temperature is reduced to 85° C. and 3.5 ml of 3% H2PtCl6 in ethanol is added. Light to then excluded from the flask by covering it with a black cloth. An exotherm is noted to about 95° C., while the contents are stirred for about 2 hours. During this time silanic hydrogen concentration drops to nil. Cool to 65° C. and slowly add 60 g of sodium bicarbonate, allow to mix overnight and filter through a 4 micron pad. Distill off any toluene at 100° C. and 1 torr.

Example 21

To a suitable flask fitted with a mechanical agitator, thermometer with a Therm-o-watch temperature regulator, nitrogen sparge tube vented reflux condenser and heating mantle is added 58 grams of Allyl Alcohol Alkoxylate Example 1, 108.0 grams of Fluoro Vinyl Intermediate Example 10. Next is added 358.0 grams of hydrosilation intermediate (Example #15) and 3,000 grams of toluene. Heat to 115° C. to remove azeotropically remove any water and 200 ml of toluene. The temperature is reduced to 85° C. and 3.5 ml of 3% H 2 PtCl 6 in ethanol is added. Light to then excluded from the flask by covering it with a black cloth. An exotherm is noted to about 95° C., while the contents are stirred for about 2 hours. During this time silanic hydrogen concentration drops to nil. Cool to 65° C. and slowly add 60 g of sodium bicarbonate. Allow to mix overnight and filter through a 4 micron pad. Distill off any toluene at 100° C. and 1 torr.

Example 22-34

Example 21 is repeated, only this time replacing the allyl alcohol intermediate with the specified number of grams of the specified allyl alcohol alkoxylate, replacing the Fluoro Vinyl Intermediate with the specified number of grams of the specified Fluoro Vinyl Intermediate and replacing the specified hydrosilation intermediate with the specified type and number of grams of the specified hydrosilation intermediate.

| Example | Allyl Alcohol Alkoxylate | | Fluoro Vinyl Intermediate | | Hydrosilation Intermediate | |
|---|---|---|---|---|---|---|
| Ex | Ex | Grams | Ex | Grams | Ex | Grams |
| 22 | 2 | 2998.0 | 11 | 308.0 | 16 | 377.0 |
| 23 | 3 | 4753.0 | 12 | 408.0 | 17 | 10000.0 |
| 24 | 4 | 498.0 | 13 | 558.0 | 18 | 148134.0 |

-continued

| Example | Allyl Alcohol Alkoxylate | | Fluoro Vinyl Intermediate | | Hydrosilation Intermediate | |
|---|---|---|---|---|---|---|
| Ex | Ex | Grams | Ex | Grams | Ex | Grams |
| 25 | 5 | 557.0 | 14 | 708.0 | 19 | 37143.0 |
| 26 | 6 | 648.0 | 10 | 108.0 | 20 | 208.0 |
| 27 | 7 | 441.0 | 11 | 308.0 | 15 | 358.0 |
| 28 | 8 | 117.0 | 12 | 408.0 | 16 | 377.0 |
| 29 | 9 | 498.0 | 13 | 558.0 | 17 | 10000.0 |
| 30 | 1 | 58.0 | 14 | 708.0 | 18 | 148134.0 |
| 31 | 2 | 2998.0 | 10 | 108.0 | 19 | 37134.0 |
| 32 | 3 | 4753.0 | 11 | 308.0 | 20 | 208.0 |
| 33 | 4 | 498.0 | 12 | 408.0 | 15 | 358.0 |
| 34 | 5 | 557.0 | 13 | 558.0 | 16 | 377.0 |

It will be understood that the mole ratio of fluoro vinyl intermediate + the mole ratio of allyl alcohol alkoxylate to the mole ratio of hydrosilation intermediate will range from 0.9 to 1.0 to 1.2 to 1.0 with a preferred ratio of 1.1 to 1.0. This will mean that under the preferred situation there will be a slight excess of fluoro vinyl intermediate + the mole ratio of allyl alcohol alkoxylate relative to hydrosilation intermediate.

Applications Results

The materials were applied to paper at 1% weight and allowed to dry. The control material was Siltech MFF-159-B a non-fluoro containing dimethicone copolyol.

Soybean oil was and water was applied to the treated paper.

| Test Solution | Soybean oil | Water |
|---|---|---|
| Siltech MFF-159-B | Pass Through | Pass Through |
| Example 33 | Did Not Pass | Pass Through |
| Example 35 | Did Not pass | Pass Through |

What is claimed;

1. A polymer which conforms to the following structure:

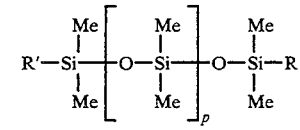

wherein;
p is an integer ranging from 1 to 2,000;
Me is methyl;
R' is $-(CH_2)_3-O-(EO)_a-(PO)_b-(EO)_c-H$ and
R is $-(CH_2)_2-(CF_2)_s-CF_3$;
s is an integer ranging from 1 to 13;
a, b and c are each independently integers ranging from 0 to 20;
EO is $-(CH_2CH_2-O)-$;
PO is a $-(CH_2CH(CH_3)-O)-$.

2. A compound of claim 1 wherein s is 13.
3. A compound of claim 1 wherein s is 5.
4. A compound of claim 1 wherein s is 7.
5. A compound of claim 1 wherein s is 11.
6. A polymer which conforms to the following structure:

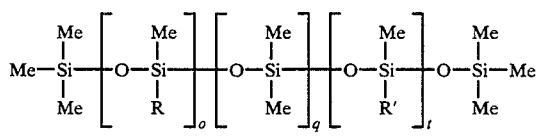

wherein;
Me is methyl;
o is an integer ranging from 1 to 20;
t is an integer ranging from 1 to 20;
q is an integer ranging from 0 to 2000;
is $-(CH_2)_3-O-(EO)_a-(PO)_b-(EO)_c-H$ and
R is $-(CH_2)_2-(CF_2)_s-CF_3$
s is an integer ranging from 1 to 13;
a, b and c are each independently integers ranging from 0 to 20;
EO is $-(CH_2CH_2-O)-$;
PO is a $-(CH_2CH(CH_3)-O)-$.

7. A polymer of claim 6 wherein s is 1.
8. A polymer of claim 6 wherein s is 5.
9. A polymer of claim 6 wherein s is 7.
10. A polymer of claim 6 wherein s is 10.
11. A polymer of claim 6 wherein s is 13.

* * * * *